United States Patent
Shevach et al.

(10) Patent No.: US 10,103,944 B2
(45) Date of Patent: Oct. 16, 2018

(54) PURPOSELY CORRUPTED PACKET FOR CONNECTION INFORMATION

(71) Applicant: Marvell World Trade Ltd., St. Michael (BB)

(72) Inventors: Gil Shevach, Ramat HaSharon (IL); Gai Nachum, Tel Aviv (IL)

(73) Assignee: Marvell World Trade Ltd., St. Michael (BB)

( * ) Notice: Subject to any disclaimer, the term of this patent is extended or adjusted under 35 U.S.C. 154(b) by 165 days.

(21) Appl. No.: 15/222,477

(22) Filed: Jul. 28, 2016

(65) Prior Publication Data

US 2017/0034003 A1    Feb. 2, 2017

Related U.S. Application Data

(60) Provisional application No. 62/197,754, filed on Jul. 28, 2015.

(51) Int. Cl.
*H04L 12/28* (2006.01)
*H04L 12/24* (2006.01)
(Continued)

(52) U.S. Cl.
CPC ............ *H04L 41/12* (2013.01); *H04L 1/0061* (2013.01); *H04L 1/0083* (2013.01);
(Continued)

(58) Field of Classification Search
CPC ....... H04L 41/12; H04L 1/0061; H04L 1/008; H04L 43/0811; H04L 43/10; H04L 43/12
(Continued)

(56) References Cited

U.S. PATENT DOCUMENTS

2006/0153096 A1* 7/2006 Nakano ............... H04L 43/50
                                                       370/252
2007/0109961 A1* 5/2007 Liang ............... H04L 43/0888
                                                       370/229
(Continued)

FOREIGN PATENT DOCUMENTS

WO    WO-2007/024161    3/2007

OTHER PUBLICATIONS

International Search Report and Written Opinion in International Application No. PCT/IB2016/054536, dated Oct. 6, 2016 (12 pages).
(Continued)

*Primary Examiner* — Christopher R Crompton (57) ABSTRACT

A method for providing connection information between a first communication device and a second communication device is described. At least one purposely corrupted packet that includes a purposely corrupted packet attribute is generated by the first communication device. The at least one purposely corrupted packet is transmitted by the first communication device to the second communication device via a port coupled to a communications network. A count of packets that are transmitted, the count of packets including the at least one purposely corrupted packet and selected additional packets, is generated by the first communication device. An indication of the count of the at least one purposely corrupted packet and the selected additional packets that are transmitted from the first communication to the second communication device via the port is provided to the second communication device.

11 Claims, 5 Drawing Sheets

(51) Int. Cl.
*H04L 1/00* (2006.01)
*H04L 12/26* (2006.01)

(52) U.S. Cl.
CPC .......... *H04L 43/0811* (2013.01); *H04L 43/10* (2013.01); *H04L 43/12* (2013.01); *H04L 43/0823* (2013.01); *Y02D 30/30* (2018.01)

(58) Field of Classification Search
USPC ........................................................ 370/254
See application file for complete search history.

(56) References Cited

U.S. PATENT DOCUMENTS

| | | | |
|---|---|---|---|
| 2008/0147846 A1 | 6/2008 | Behroozi et al. | |
| 2009/0220073 A1* | 9/2009 | Verghese | H03M 7/30 380/29 |
| 2014/0105064 A1 | 4/2014 | Goldschlager et al. | |

OTHER PUBLICATIONS

IEEE Std. 802.1AB™, "IEEE Standard for Local and Metropolican area networks—Station and Media Access Control Connectivity Discovery," IEEE Computer Society, 172 pages (Mar. 20, 2005).
IEEE Std 802.1Q, 2003 Edition, "IEEE Standards for Local and Metropolitan area networks—Virtual Bridged Local Area Networks," *The Institute of Electrical and Electronics Engineers, Inc.*, 327 pages (May 7, 2003).
IEEE Std 802.1Q—2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).
IEEE Std 802.3-2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, 2695 pages (Dec. 9, 2005).
IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).
Chen, "Home Network Basis: Transmission Environments and Wired/Wireless Protocols," Prentice Hall, pp. 1-26 (Jul. 2006).
IEEE Std. 802.1AB™, "IEEE Standard for Local and Metropolican area networks—Station and Media Access Control Connectivity Discovery," IEEE Computer Society, 172 pages (Mar. 20, 2005).
U.S. Appl. No. 14/078,013, Goldschlager, et al., "Cable Discovery," filed Nov. 12, 2013.
U.S. Appl. No. 14/102,665, Goldschlager, "Network Traffic View," filed Dec. 11, 2013.
U.S. Appl. No. 14/073,033, Goldschlager et al., "Link Attributes Display," filed Nov. 6, 2013.
IEEE P802.1ad/D6.0, Draft Amendment to IEEE Std 802.1Q, "IEEE Draft Standard for Local and Metropolitan Area Networks—Virtual Bridged Local Area Networks—Amendment 4: Provider Bridges," *The Institute of Electrical and Electronics Engineers, Inc.*, 60 pages, (Aug. 17, 2005).
IEEE Std 802.1Q, 2003 Edition, "IEEE Standards for Local and Metropolitan area networks Virtual Bridged Local Area Networks," *The Institute of Electrical and Electronics Engineers, Inc.*, 327 pages (May 7, 2003).
IEEE Std 802.1Q-2011 (Revision of IEEE Std.802.1Q-2005), "IEEE Standard for Local and Metropolitan Area Networks—Media Access Control (MAC) Bridges and Virtual Bridged Local Area Networks," The Institute of Electrical and Electronics Engineers, Inc., 1,365 pages (Aug. 31, 2011).
IEEE Std 802.3-2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, 379 pages (Mar. 8, 2002).

\* cited by examiner

PURPOSELY CORRUPTED PACKET FOR CONNECTION INFORMATION

CROSS-REFERENCES TO RELATED APPLICATIONS

This disclosure claims the benefit of U.S. Provisional Patent Application No. 62/197,754, entitled "Discovery of Directly-Connected Link Partner" and filed on Jul. 28, 2015, the disclosure of which is incorporated herein by reference in its entirety.

FIELD OF THE DISCLOSURE

The present disclosure relates generally to communication networks and, more particularly, to connection information for communication links between communication devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Communication networks, such as computer networks, typically include several interconnected communication devices that communicate with each other using data units e.g., packets, frames and so on). Various tools have been developed for discovering various aspects of a physical topology of a communication network, and displaying network connections.

SUMMARY

In an embodiment, a method for providing connection information between a first communication device and a second communication device includes: generating, by the first communication device, at least one purposely corrupted packet that includes a purposely corrupted packet attribute; transmitting, by the first communication device, the at least one purposely corrupted packet to the second communication device via a port coupled to a communications network; generating a count of packets that are transmitted, the count of packets including the at least one purposely corrupted packet and selected additional packets; and providing to the second communication device an indication of the count of the at least one purposely corrupted packet and the selected additional packets that are transmitted from the first communication to the second communication device via the port.

In another embodiment, a first communication device for providing connection information between the first communication device and a second communication device includes a network interface device having one or more integrated circuits. The one or more integrated circuits are configured to generate at least one purposely corrupted packet that includes a purposely corrupted packet attribute, transmit the at least one purposely corrupted packet to the second communication device via a port coupled to a communications network, generate a count of packets that are transmitted, the count of packets including the at least one purposely corrupted packet and selected additional packets, and provide to the second communication device an indication of the count of the at least one purposely corrupted packet and the selected additional packets that are transmitted from the first communication to the second communication device via the port.

In an embodiment, a method for determining a presence or absence of an intermediate communication device between a first communication device and a second communication device includes: determining, by a processor, a first number of packets received at the second communication device from the first communication device; receiving, by the processor, an indication of a second number of packets transmitted by the first communication device to the second communication device, wherein the indication of the second number of packets indicates a transmission of at least one purposely corrupted packet by the first communication device to the second communication device; and determining, by the processor, the presence or absence of the intermediate communication device between the first communication device and the second communication device in response to a comparison of the first number of packets received by the second communication device and the second number of packets transmitted by the first communication device.

In another embodiment, a network interface device for determining a presence or absence of an intermediate communication device between a first communication device and a second communication device includes one or more integrated circuits. The one or more integrated circuits are configured to determine a first number of packets received at the first communication device from the second communication device, receive an indication of a second number of packets transmitted by the second communication device to the first communication device, wherein the indication of the second number of packets indicates a transmission of at least one purposely corrupted packet by the second communication device to the first communication device, and determine the presence or absence of the intermediate communication device between the first communication device and the second communication device in response to a comparison of the first number of packets received from the second communication device and the second number of packets transmitted by the second communication device.

DETAILED DESCRIPTION

When a communication link between two devices is routed through a hub or one or more unknown intermediate communication devices, connection information used to develop a picture of network connections may be lost or unavailable in some scenarios. Without this connection information, discovery of the physical topology of a communication network is inaccurate or incomplete. In at least some embodiments described herein, a first communication device generates purposely corrupted packets and transmits the purposely corrupted packets to a second communication device. In one scenario, in an embodiment, where a communication link between the first communication device and the second communication device is a direct connection, the second communication device receives substantially all of the purposely corrupted packets. In this scenario, in an embodiment, the second communication device determines that the communication link is a direct connection in response to having ascertained that all of the purposely corrupted packets, or a percentage of purposely corrupted packets in excess of a configurable threshold, have been received.

In another scenario where an intermediate communication device connects the first and second communication devices e.g., an indirect connection), the intermediate communication device filters, drops, or otherwise prevents the receipt of the purposely corrupted packets by the second communication device. In this scenario, in an embodiment, the second communication device determines that the communication link is an indirect connection in response to having ascertained that substantially less than all of the purposely corrupted packets, or a percentage of the purposely corrupted packets that is less than a configurable threshold, have been received.

In various embodiments and/or scenarios, purposely corrupted packets include packets having a packet attribute that has been purposely corrupted. Examples of purposely corrupted packet attributes include a purposely corrupted or improper cyclic redundancy check (CRC) value or frame check sequence (FCS) value, a packet size that is larger than a maximal permitted packet size, a packet size that is smaller than a minimal permitted packet size, an incompatible packet format, or other suitable corrupted packet attribute.

In an embodiment, an indication of the first communication device having transmitted one or more purposely corrupted packets is provided to the second communication device. In an embodiment, the first communication device sends to the second communication device an indication of the number of purposely corrupted packets sent, for example, as a field in a diagnostic packet, an operations and management (OAM) packet, or other suitable packet. In another embodiment, a central network controller or network management device controls a number of purposely corrupted packets that are generated and sent by the first communication device, and ascertains, by communicating with the second device, a number of the purposely corrupted packets that are received by the second communication device. In this embodiment, the determination of the presence of a direct connection, or routing though an intermediate communication device, is made at the central network controller.

In an embodiment, in response to the receipt of the indication of the transmission and based on a comparison of a count of packets received to packets sent, including the purposely corrupted packets, the second communication device determines the presence or absence of the intermediate communication device and communicates its determination to at least one other communication device in the communication network, to a central network controller, or to a network administrator. For example, in response to receipt of the indication of the transmission of the purposely corrupted packets without having received the purposely corrupted packets, the second communication device determines that the intermediate communication device is present (e.g., by inferring that the intermediate communication device has filtered the purposely corrupted packet). In some embodiments, an image that represents the physical topology and indicates network connections for the second communication device is generated based on the determined presence or absence of the intermediate communication device.

Figure 1:
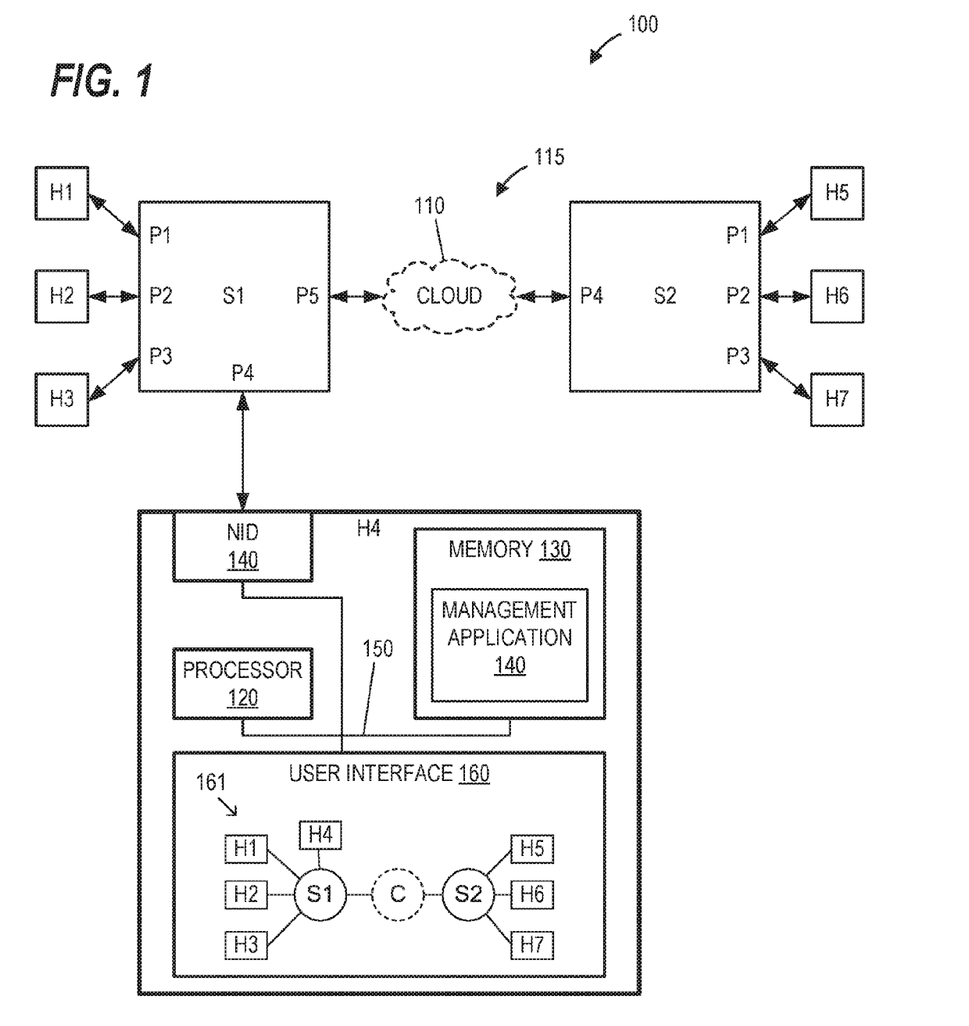
FIG. 1 is a block diagram of an example communication network that has a direct connection or an indirect connection between first and second communication devices, according to an embodiment.

FIG. 1 is a block diagram of an example communication network 100, according to an embodiment. In an embodiment, the communication network 100 includes a plurality of devices coupled together by communication links to form a plurality of nodes in the communication network 100. In an embodiment, for example, the communication network 100 includes host devices, such as host devices H1, H2, H3, H4, H5, H6, and H7 that form host nodes (referred to herein as "hosts"). Further, the communication network 100 includes switch devices, such as switch devices S1 and S2, that form switch nodes (referred to herein as "switches"). While only hosts H1-H7 and switches S1 and S2 are shown, the communication network 100 has additional or fewer hosts and/or additional or fewer switches, in other embodiments. In the embodiment shown in FIG. 1, hosts H1, H2, H3, and H4 are coupled with ports P1, P2, P3, and P4 of switch S1, hosts H5, H6, and H7 are coupled with ports P1, P2, and P3 of switch S2, and switch S1 (via port P5) is directly or indirectly coupled with switch S2 (via port P4).

The communication network 100 is any suitable network, in various embodiments. In an embodiment, the communication network 100 is a local area network (LAN). In an embodiment, the communication network 100 is a Layer 2 network that uses technologies at a data link layer, such as Ethernet or other suitable technologies, for communication between hosts in the LAN. In some embodiments, the communication network 100 is coupled to the Internet via a suitable router (not shown).

The hosts H1-H7 are any suitable communication devices, such as voice over IP (VoIP) phones, computers, laptops, TVs, servers, or other suitable devices that are configured to be a source of network traffic and/or a destination of network traffic, in various embodiments. Generally, a communication device includes one or more network interface controllers (NICs) connected to the switch devices S1 or S2 via wired or wireless communication links. It is noted that when the communication device includes multiple NICs connected to the switch devices, the communication device is considered as a set of hosts and each connection has its own media access control (MAC) address, in an embodiment. In various embodiments and/or scenarios, the hosts H1-H7 communicate with each other via the switches S1 and S2.

The switches S1 and S2 are any suitable switch devices, in various embodiments. Generally, a switch includes a plurality of ports connected to hosts, other switches, or other suitable communication devices. The switch is configured to receive a network traffic unit (e.g., a data link frame or packet) from a port (e.g., ingress port) and forward the received packet to one or more ports (e.g., egress ports) based on network configuration information and addresses that are contained in the network traffic unit. In an embodiment, a switch device includes a plurality of tables storing network configuration information. The network configuration information includes, for example, port connectivity information of the switch device, port connectivity information of other switch devices in the communication network 100, virtual LAN (VLAN) configuration, or other suitable information. In an example, the network configuration information is changed via a software program application (e.g., a management application) by a network administrator.

In various embodiments and/or scenarios, one or more intermediate communication devices 110 (illustrated as a cloud with dashed lines) is present or absent (e.g., optionally located) between two or more devices of the communication network 100 (e.g., on a communication link 115). In the embodiment shown in FIG. 1, the intermediate communication device 110 is optionally located between the switch S1 and the switch S2 on the communication link 115. In other words, the switch S1 and the switch S2 are i) directly connected to each other when the intermediate communication device 110 is absent, and ii) indirectly connected to each other when the intermediate communication device 110 is present. In various embodiments, the intermediate communication device 110 includes one or more switches, hosts, hubs, or other suitable communication devices. In some embodiments, the intermediate communication device 110 corresponds to a cloud network, the Internet, a communication network separate from the communication network 100, or other suitable group of communication devices.

The intermediate communication device 110 is configured to filter, drop, or otherwise prevent forwarding (referred to herein as "filtering") of corrupted packets, in various embodiments. In some embodiments, a packet is determined to be corrupt according to a communication protocol utilized on the communication link 115 or by the intermediate communication device 110. In various embodiments and/or scenarios, the communication protocol is the Institute of Electrical and Electronics Engineers (IEEE) 802.3 communication protocol (e.g., Ethernet protocol) or other suitable protocol. In an embodiment, purposely corrupted packets include packets having a purposely corrupted packet attribute, for example, a purposely corrupted or improper cyclic redundancy check (CRC) value or frame check sequence (FCS) value, for example, a packet having a CRC value that does not correspond to a data portion of the packet. In an embodiment, purposely corrupted packets include packets that have a packet size that is larger than a maximum packet size for the communication protocol, for example, larger than 1518 bytes for the Ethernet protocol (or 1522 bytes with an optional 802.1Q tag of 4 bytes), including the media access control (MAC) header (14 bytes) and CRC checksum (4 bytes). In an embodiment, purposely corrupted packets include packets that have a packet size which is smaller than a minimum packet size for the communication protocol, for example, smaller than 64 bytes for the Ethernet protocol (excluding a preamble of 7 bytes and start of frame delimiter of one byte). In other embodiments and/or scenarios, other incompatible packet formats are determined to be corrupt by the intermediate communication device 110.

For brevity and clarity of explanation, the description herein is generally based on an embodiment having a single instance of the intermediate communication device 110 that is located on the communication link 115 (i.e., between the switch S1 and the switch S2). In other embodiments or scenarios, the intermediate communication device 110 is located on other suitable communication links of the communication network 100, for example, between the switch S1 and the host H1. In some embodiments, multiple instances of the intermediate communication device 110 are located on suitable communication links of the communication network 100.

The communication network 100 includes at least one communication device configured to determine whether a communication link is directly connected or indirectly connected, in various embodiments. In other words, the communication device determines whether one or more of its ports coupled to the communications network 100 have a direct connection or an indirect connection to another communication device. In an embodiment, for example, the switch S2 is configured to determine whether a port coupled to the communication link 115 is i) directly connected to the switch S1, or ii) indirectly connected to the switch S1 via the intermediate communication device 110.

In some embodiments, a central network controller, network management device, or other suitable communication device determines whether communication links of the communication network 100 are directly connected or indirectly connected based on indications received from communication devices connected to the communication links. In an embodiment, for example, the host H4 is a dedicated network management device for the communications network 100 that determines whether the communication link 115 is directly connected or indirectly connected based on indications received from the switch S1, the switch S2, or both the switches S1 and S2. In an embodiment, the host h4 determines the presence or absence of the intermediate communication device 110 based on a number of purposely corrupted packets sent by the switch S1 and a number of purposely corrupted packets received at the switch S2. In an embodiment, the host H4 is a network management device or central network controller that provides a user interface for a network management application that indicates the presence or absence of intermediate communication devices in the communication network 100.

In the embodiment shown in FIG. 1, the host H4 includes a processor 120, a memory 130, a network interface device (NID) 140, and a user interface 160 communicatively coupled together by a bus 150. In other embodiments, the user interface 160 is omitted. In some embodiments, one or more of the processor 120, the memory 130, and the network interface device 140 are implemented as one or more integrated circuits. The hosts H1-H3 and H5-H7 are generally similar to the host H4, having a processor, a memory, a NID, and optional user interface communicatively coupled together by a bus (not shown for clarity), in various embodiments. The switches S1 and S2 include a processor, a memory, a NID, and user interface communicatively coupled together by a bus similarly to the host H4, but not shown for clarity), in various embodiments. In an embodiment, one or both of the switches S1 and S2 omit the user interface.

The processor 120 executes system and application instructions to perform system functions and application functions. The memory 130 stores system and application instructions, such as instructions 150 for the management application. In addition, the memory 130 stores data processed or to be processed by the processor 120. In an embodiment, the memory 130 stores network configuration information, such as a network topology for the communication network 100. The network topology includes, for example, coupling information of hosts to ports of the switches, coupling pairs of ports of different switches, relationship of workgroups to VLANs, WAN membership, or other suitable information. The memory 130 includes a hard disk drive, an optical storage medium, a solid-state drive, random access memory, or other suitable memory device, in various embodiments.

The user interface 160 includes a touch screen, a display, a keyboard, a mouse, a printer, or other suitable user interface devices. In the embodiment shown in FIG. 1, the user interface 160 includes a graphical user interface (GUI) 161 for interaction with a user, for example, displaying an image that represents the physical topology and indicates network connections of the communication network 100. In an embodiment, the GUI 161 uses suitable graphical elements, such as picture icons, to represent devices, such as the host devices, the switch devices, or other suitable communication devices. In an embodiment, the GUI includes laptop icons, desktop icons, phone icons, switch icons, or other suitable icons to represent the devices in the communication network 100. In some embodiments, the processor 120 generates the image that represents the physical topology and the GUI 161 displays the image.

Figure 2A:
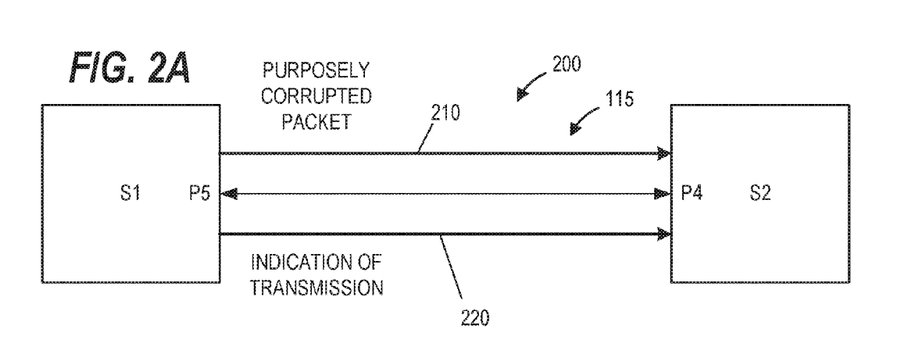
FIG. 2A is a diagram of an example packet flow through the communication network of FIG. 1 and illustrates a direct connection, according to an embodiment.
Figure 2B:
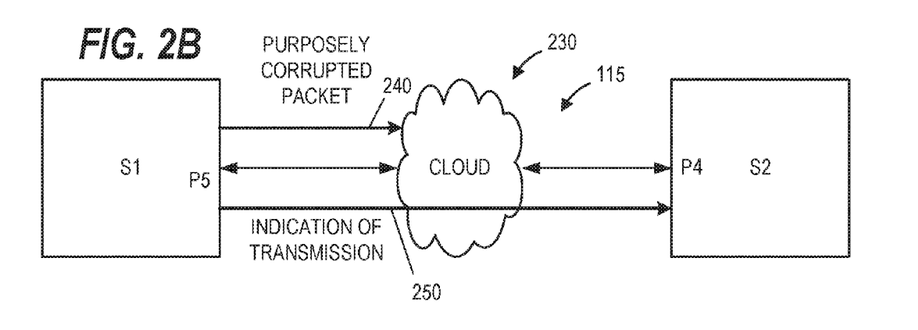
FIG. 2B is a diagram of another example packet flow through the communication network of FIG. 1 and illustrates an indirect connection, according to an embodiment.
Figure 2C:
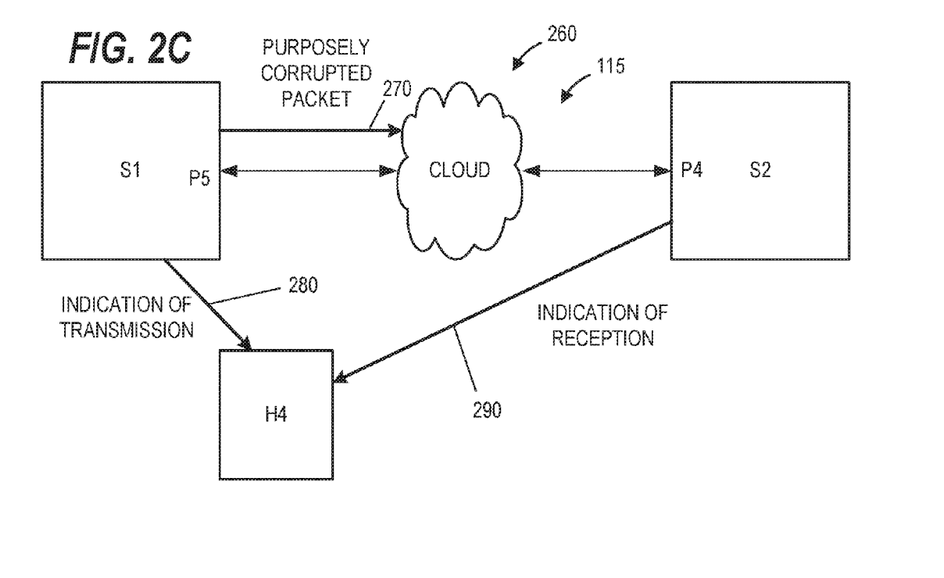
FIG. 2C is a diagram of yet another example packet flow through the communication network of FIG. 1 and illustrates an indirect connection with a network management device, according to an embodiment.

FIG. 2A, FIG. 2B, and FIG. 2C are diagrams of example packet flows 200, 230, and 260, respectively, through a communication network (e.g., communication network 100), according to various embodiments. In the embodiment shown in FIG. 2A, the intermediate communication device 110 is absent between the switch S1 and the switch S2 (e.g., on the communication link 115). In the embodiment shown in FIG. 2B, the intermediate communication device 110 is present between the switch S1 and the switch S2. In the embodiment shown in FIG. 2C, the intermediate communication device 110 is present between the switch S1 and the switch S2 and the host H4 is communicatively coupled, directly or indirectly, with the switch S1 and the switch S2.

As discussed above, in various embodiments and/or scenarios, a first communication device generates and transmits purposely corrupted packets, generates an indication of the transmission of the purposely corrupted packets, and transmits the indication. In an embodiment, the switch S1 i) generates the purposely corrupted packets, ii) transmits the purposely corrupted packets to the switch S2 (e.g., purposely corrupted packet 210, 240, or 270), iii) generates the indication that indicates a count of the number of purposely corrupted packets that are sent, and iv) transmits the indication to the switch S2 (e.g., indication of transmission 220 or 250). The switch S2 determines a first number of packets received from the switch S1 where the first number includes or indicates at least the purposely corrupted packets received from the switch S1. The switch S2 determines a second number of packets (e.g., the count of the number of purposely corrupted packets that are sent), for example, based on information communicated in a diagnostic packet, an operations and management (OAM) packet, or other suitable packet. In an embodiment, for example, the switch S2 receives the indication of the transmission 220 or 250 that includes an indication of the second number of packets (e.g., that includes the actual number of purposely corrupted packets transmitted to the switch S2). In some embodiments, the indication 220 or 250 includes a count of the at least one purposely corrupted packet and selected additional packets (e.g., uncorrupted packets).

In various embodiments and/or scenarios, the switch S2 determines the presence or absence of the intermediate communication device 110 in response to a comparison of the second number of packets sent and the first number of packets that are actually received. In an embodiment, for example, the switch S2 determines that the intermediate communication device 110 is present if the first number of packets is less than the second number of packets (e.g., purposely corrupted packet 240 has been filtered) or determines that the intermediate communication device 110 is absent if the first number of packets is equal to the second number of packets (e.g., purposely corrupted packet 210 has been received). In another embodiment, the switch S2 utilizes a configurable threshold, for example, based on a percentage, to compare the first number and the second number. In this embodiment, the configurable threshold allows a suitable determination of the presence of absence of the intermediate communication device 110 where at least some purposely corrupted packets are dropped even if the dropped packets are not dropped because they are purposefully corrupted (e.g., if the purposely corrupted packets are dropped due to network congestion). In an embodiment, for example, the switch S2 determines that the intermediate communication device 110 is absent if 90% or more of the purposely corrupted packets sent by the first communication device are received by the switch S2 (e.g., if the first number of packets received is 90% or more of the second number of packets sent).

In another embodiment shown in FIG. 2C, the switch S1 performs steps i), ii), and iii) as in the embodiment described above, but instead performs step iv) by transmitting an indication of the transmission 280 of the second number of packets to the host H4 or another suitable communication device, for example, a network manager device of the communication network 100. In this embodiment, the host H4 receives, from the switch S2, an indication 290 of the first number of packets received at the switch S2 from the switch S1. The host H4 determines the presence or absence of the intermediate communication device 110 (e.g., between the switch S1 and the switch S2) in response to a comparison of the first number of packets and the second number of packets, as described above. In an embodiment, the host H4 provides an instruction or request (not shown) to the switch S2 to provide the indication 290.

In some embodiments, the switch S1 performs steps i) and ii) similarly to the embodiment shown in FIG. 2C, except that the switch S1 performs the steps i) and ii) in response to an instruction provided by the host H4 (e.g., a network management device) that indicates the number of purposely corrupted packets to be generated and transmitted by the switch S1. In an embodiment, the switch S1 provides an acknowledgment of the instruction to the host H4. In other words, the indication of the transmission 280 is replaced by an exchange whereby the host H4 provides switch S1 with an instruction to generate an integer number N of purposely corrupted packets, and switch S1 returns an acknowledgment that the purposely corrupted packets have been transmitted. In an embodiment, the host H4 provides to the switch S2 an indication of the second number of purposely corrupted packets transmitted by the switch S1 (e.g., an indication similar to indications 220 or 250), thus, the indication of the number of purposely corrupted packets is independent of a diagnostic packet transmitted from switch S1 to switch S2.

Figure 3:
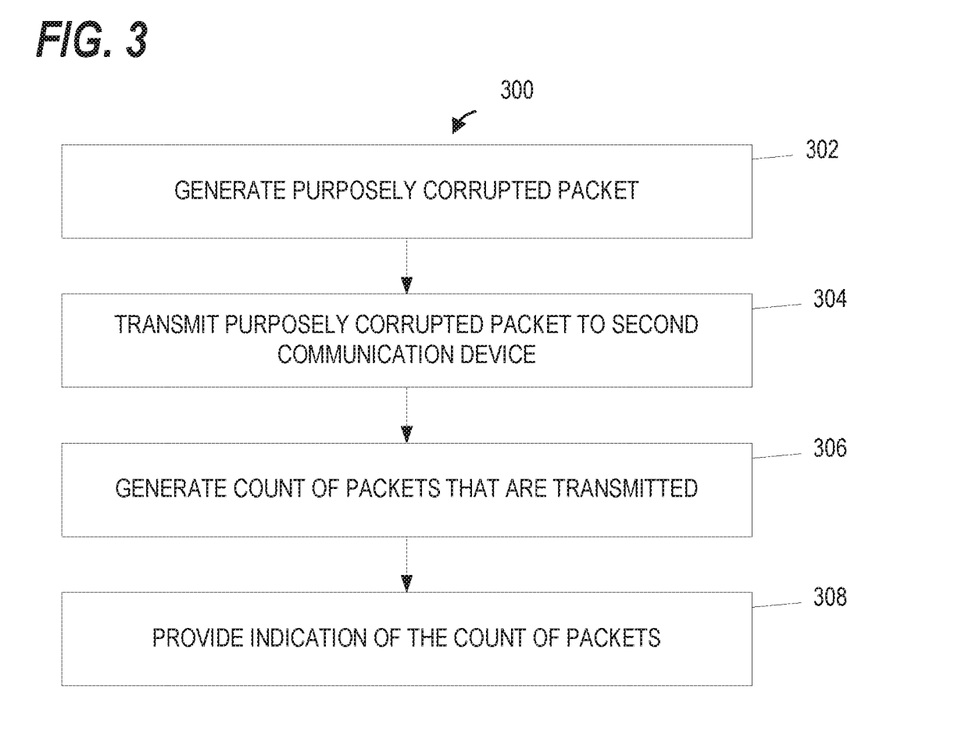
FIG. 3 is a flow diagram of an example method for providing connection information between the first communication device and the second communication device of FIG. 1, according to an embodiment.

FIG. 3 is a flow diagram of an example method 300 for providing connection information for a communication link between a first communication device and a second communication device, according to an embodiment. In various embodiments, the method 300 is implemented by a host or communication device in the communication network 100. With reference to FIG. 1, the method 300 is implemented by the switch S1, in the description below. For example, the processor of the switch S1 (not shown) is configured to implement the method 300. With continued reference to FIG. 1, in other embodiments, the method 300 is implemented by switch S2, the host H4, or other suitable communication device.

The switch S1 initiates the method 300 in response to a connection of the communication link 115, in an embodiment. For example, where the port P5 is an Ethernet port, the switch S1 initiates the method 300 when a first end of a suitable cable (e.g., category 5 cable, category 5e cable, etc.) is plugged into the port P5 of the switch S1 and a second end of the cable is plugged into another communication device (e.g., the intermediate communication device 110 or the switch S2). In some embodiments, the switch S1 initiates the method 300 in response to a request for connection information (e.g., received from the host H4), an expiration of a timer, or an auto-negotiation procedure for the communication link 115.

At block 302, at least one purposely corrupted packet that includes a purposely corrupted packet attribute is generated by a first communication device. For example, the switch S1 generates the purposely corrupted packets 210, 240, or 270. In an embodiment, switch S1 randomly or pseudo-randomly selects the number of purposely corrupted packets (i.e., the second number of packets) from a predetermined range of values (e.g., one, two, five, ten, or more packets). In other embodiments, the number of purposely corrupted packets is predetermined or selected based on suitable parameters or a configuration of the switch S1. In an embodiment, the number of purposely corrupted packets is identified by an instruction received from a network management device.

As described above, purposely corrupted packets include, for example, those packets with a corrupted CRC value or FCS value, a large packet size, a small packet size, or other incompatible packet format. In an embodiment, the purposely corrupted packets are of the same corruption type, for example, having corrupted CRC values but not FCS values, size, or format corruptions. In other embodiments, the purposely corrupted packets have different corruption types. In one such embodiment, the switch S1 generates the purposely corrupted packets to have a predetermined sequence of corruption types, for example, five packets including three corrupted CRC values followed by an oversize packet and an undersized packet, or other suitable sequences.

At block 304, the at least one purposely corrupted packet is transmitted by the first communication device to the second communication device via a port coupled to a communications network. For example, the switch S1 transmits the purposely corrupted packets 210, 240, or 270 to the switch S2 via the communication link 115. In some embodiments, the switch S1 generates and transmits uncorrupted packets to the switch S2 along with the purposely corrupted packets. In an embodiment, for example, the sequence of packets transmitted to the switch S2 includes one or more uncorrupted packets along with the one or more corrupted packets.

At block 306, the first communication device generates a count of packets that are transmitted, the count of packets including the at least one purposely corrupted packet and selected additional packets. In some embodiments, the count of packets includes zero selected additional packets. In other words, the count of packets includes only purposely corrupted packets. In other embodiments, the count of packets includes one, two, three, or more uncorrupted packets (e.g., the selected additional packets) along with the purposely corrupted packets.

At block 308, an indication of the count of the at least one purposely corrupted packet and the selected additional packets that are transmitted from the first communication to the second communication device via the port is provided to the second communication device. For example, the switch S1 generates and transmits the indication 220, 250, or 280 to the second communication device. In an embodiment, the indication of the count is included as an advertisement of a link layer discovery protocol (LLDP) frame. In another embodiment, providing the count includes populating a field in a diagnostic packet to indicate the count of packets that are transmitted.

In an embodiment, the indication of the count indicates the number of purposely corrupted packets transmitted by the switch S1 to the switch S2. In another embodiment, the indication indicates a total number of packets, including purposely corrupted packets, transmitted by the switch S1 to the switch S2. For example, the switch S1 transmits a sequence of packets that includes five purposely corrupted packets and four uncorrupted packets and the indication indicates a total number of nine packets. In an embodiment, the indication indicates a corruption type (or sequence of corruption types) of the purposely corrupted packets.

In an embodiment, the switch S1 transmits the indication (e.g., the LLDP frame) to the switch S2. In another embodiment, the switch S1 transmits the indication to the host H4 or other suitable network management device of the communication network 100. In yet another embodiment, the host H4 transmits the indication to the switch S2. In some embodiments, the count is maintained at a network management device of the communications network, for example, at the host H4. In an embodiment, the host H4 provides the indication of the count to the second communication device.

In some embodiments, the switch S2 determines whether the port coupled to the communications network has a direct connection or an indirect connection to the first communication device. In an embodiment, for example, the switch S2 generates an image that indicates network connections for the switch S2 based on the determined presence or absence of the intermediate communication device 115, as described above. In other embodiments, the host H4 generates the image that indicates the network connections.

The indication of the transmission and the at least one purposely corrupted packet provide connection information that indicates a presence or absence of an intermediate communication device between the first communication device and the second communication device. In other words, the presence or absence of the intermediate communication device 110 is determinable based on a comparison of the second number of packets (e.g., five corrupted packets or nine total packets) and a first number of packets received at the switch S2.

Figure 4:
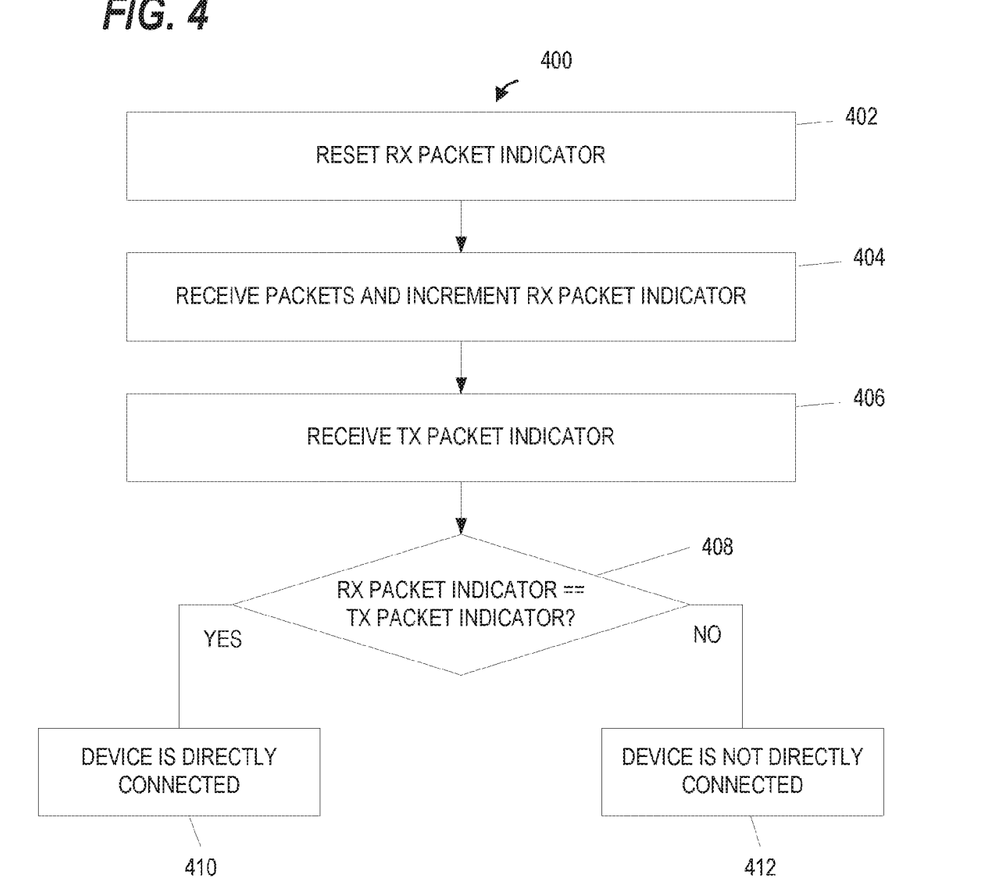
FIG. 4 is a flow diagram of an example method for determining a presence or absence of an intermediate communication device between the first communication device and the second communication device of FIG. 1, according to an embodiment.

FIG. 4 is a flow diagram of an example method 400 for determining a presence or absence of an intermediate communication device between a first communication device and a second communication device, according to an embodiment. In various embodiments, the method 400 is implemented by a host or communication device in the communication network 100. With reference to FIG. 1, the method 400 is implemented by the switch S2, in the description below. For example, the processor of the switch S2 (not shown) is configured to implement the method 400. With continued reference to FIG. 1, in other embodiments, the method 400 is implemented by switch S1, the host H4, or other suitable communication device.

The switch S2 initiates the method 400 in response to a connection of the communication link 115, in an embodiment. In some embodiments, the switch S2 initiates the method 400 in response to a request for connection information (e.g., received from the host H4), an expiration of a timer, or an auto-negotiation procedure for the communication link 115.

At block 402, the switch S2 resets a received (RX) packet indicator. The RX packet indicator is a "bad packet counter" that indicates a number of corrupted packets that have been received from the switch S1 via the communication link 115. In an embodiment, the RX packet indicator is a number of corrupted packets. In another embodiment, the RX packet indicator is a total number of packets received that includes corrupted packets. In some embodiments, the switch S2 generates and transmits a request for verification to the switch S1 and the switch S1 generates and transmits the indication 220, 250, or 280 in response to the request for verification. In other embodiments, the switch S1 generates and transmits the purposely corrupted packets and the indication 220, 250, or 280 in response to the request for verification.

At block 404, the switch S2 receives one or more packets from the switch S1 and, in response to receipt of a corrupted packet (e.g., purposely corrupted packet 210), increments the RX packet indicator, in an embodiment. In another embodiment, the switch S2 increments the RX packet indicator in response to receipt of both corrupted packets and uncorrupted packets.

At block 406, the switch S2 receives a transmitted TX) packet indicator from the switch S1. The TX packet indicator is an indication of the transmission of the purposely corrupted packets. For example, the switch S2 receives the indication 220 or 250 from the switch S1. In an embodiment, the switch S2 receives an advertisement in an LLDP frame that includes the TX packet indicator.

At block 408, the switch S2 performs a comparison of the RX packet indicator and the TX packet indicator. In an embodiment, for example, the switch S2 determines whether the RX packet indicator is less than or equal to the TX packet indicator. In other embodiments, the switch S2 determines whether the RX packet indicator exceeds a predetermined threshold. In an embodiment, for example, the switch S2 determines that the switch S2 is directly connected where the RX packet indicator is greater than a percentage threshold of the TX packet indicator (e.g., greater than 80%, 90%, or another suitable percentage of the TX packet indicator). The switch S2 utilizes the predetermined threshold to account for purposely corrupted packets that may have been dropped for reasons other than their purposeful corruption, e.g., because of network congestion.

At block 410, in response to a determination that the RX packet indicator meets or exceeds the predetermined threshold (e.g., purposely corrupted packet 210 has been received; YES at block 408), the switch S2 determines that the intermediate communication device 110 is absent and that the communication link 115 is directly connected.

At block 412, in response to a determination that the RX packet indicator is less than predetermined threshold (e.g., a sufficient number of purposely corrupted packets 240 have been filtered; NO at block 408), the switch S2 determines that the intermediate communication device 110 is present and that the communication link 115 is not directly connected (e.g., that there is a cloud or other network device between the switch S1 and the switch S2). In an embodiment, the predetermined threshold isolates noise from dropped packets that are not purposefully corrupted.

Figure 5:
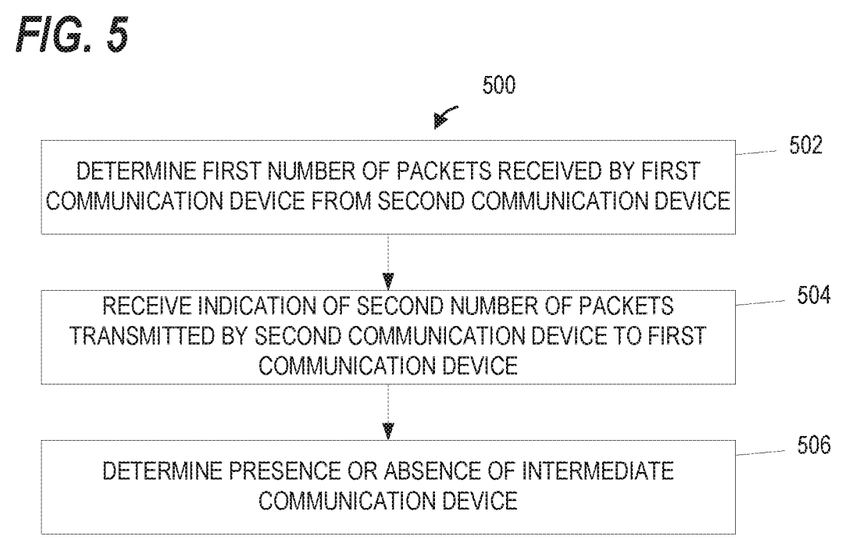
FIG. 5 is a flow diagram of another example method for determining the presence or absence of the intermediate communication device between the first communication device and the second communication device of FIG. 1, according to an embodiment.

FIG. 5 is a flow diagram of another example method 500 for determining a presence or absence of an intermediate communication device between a first communication device and a second communication device, according to an embodiment. In various embodiments, the method 500 is implemented by a host or communication device in the communication network 100. With reference to FIG. 1, the method 500 is implemented by the host H4, in the description below. For example, the processor of host H4 (not shown) is configured to implement the method 500. With continued reference to FIG. 1, in other embodiments, the method 500 is implemented by switch S1, the switch S2, or other suitable communication device.

At block 502, a processor of the host H4 determines a first number of packets that have been received at the second communication device from the first communication device, for example, based on the indication 290 received from the switch S2. In an embodiment, for example, the host H4 receives from the switch S2 the indication 290, and determines the first number of packets to be equal to the count of packets that includes the at least one purposely corrupted packet and selected additional packets. In another embodiment, a processor of the switch S2 determines the first number of packets.

At block 504, the processor of the host H4 receives an indication of a second number of packets transmitted by the first communication device to the second communication device. The indication of the second number of packets indicates a transmission of at least one purposely corrupted packet by the first communication device to the second communication device. In an embodiment, the host H4 receives the indication 280 from the switch S1. In another embodiment, the switch S2 receives the indication 220 or 250 from the switch S1.

In an embodiment, the indication of the second number of packets indicates a total number of packets, including purposely corrupted packets, transmitted by the switch S1 to the switch S2. For example, the switch S1 transmits a sequence of packets that includes five purposely corrupted packets and four uncorrupted packets and the indication indicates a total number of nine packets. In an embodiment, the indication indicates a corruption type (or sequence of corruption types) of the purposely corrupted packets.

At block 506, the processor of the host H4 determines the presence or absence of an intermediate communication device between the first communication device and the second communication device in response to a comparison of the first number of packets received from the second communication device and the second number of packets transmitted by the second communication device. In response to a determination that the first number of packets is equal to the second number of packets purposely corrupted packet 210 has been received), the host H4 (or the switch S2, in another embodiment) determines that the intermediate communication device 110 is absent and that the communication link 115 is directly connected. In response to a determination that the first number of packets is less than the second number of packets (e.g., purposely corrupted packet 240 has been filtered), the host H4 or switch S2 determines that the intermediate communication device 110 is present and that the communication link 115 is not directly connected (e.g., that there is a cloud or other network device between the switch S1 and the switch S2). In other embodiments, the host H4 or switch S2 performs the comparison based on a predetermined threshold, for example, the percentage threshold described above.

In some embodiments, where the indication indicates a total number of packets, including purposely corrupted packets, the host H4 or switch S2 compares the total numbers of packets received and transmitted (e.g., nine packets in the example described above). In an embodiment, the indication indicates a corruption type (or sequence of corruption types) of the purposely corrupted packets and the host H4 or switch S2 also determines whether the sequence of corruption types or sequence of corrupted and uncorrupted packets matches a predetermined sequence or an advertised sequence (e.g., a sequence indicated by the LLDP frame).

In some embodiments, the host H4 or switch S2 generates an image that indicates network connections for the second communication device (e.g., switch S2) based on the determined presence or absence of the intermediate communication device 115. For example, the host H4 generates an image that represents a physical topology or network map of the communication network 100 and that indicates network connections for the second communication device (e.g., whether the network connections for the second communication device are direct connections or indirect connections). In the embodiment shown in FIG. 1, the image is displayed by the host H4 via the GUI 161.

Although the above-described embodiments refer to the communication link 115 between the switch S1 and the switch S2, the physical topology of other communication links of the communication network 100 is determined by other suitable communication devices of the communication network 100, in some embodiments and/or scenarios.

Further aspects of the present invention relate to one or more of the following clauses.

In an embodiment, a method for providing connection information between a first communication device and a second communication device includes: generating, by the first communication device, at least one purposely corrupted packet that includes a purposely corrupted packet attribute; transmitting, by the first communication device, the at least one purposely corrupted packet to the second communication device via a port coupled to a communications network; generating a count of packets that are transmitted, the count of packets including the at least one purposely corrupted packet and selected additional packets; and providing to the second communication device an indication of the count of the at least one purposely corrupted packet and the selected additional packets that are transmitted from the first communication to the second communication device via the port.

In other embodiments, the method includes any suitable combination of one or more of the following features.

Generating the at least one purposely corrupted packet includes generating a purposely corrupted cyclic redundancy check (CRC) for respective ones of the at least one purposely corrupted packet. Providing the count includes populating a field in a diagnostic packet to indicate a number of packets having the corrupted CRC that are transmitted.

Generating the at least one purposely corrupted packet includes generating a purposely corrupted packet having a packet size that is i) larger than a maximum packet size for a communication protocol, or ii) smaller than a minimum packet size for the communication protocol.

Providing to the second communication device the indication of the count of the at least one purposely corrupted packet and the selected additional packets includes providing a diagnostic packet with a field that includes the indication of the count.

Providing to the second communication device the indication of the count of the at least one purposely corrupted packet and the selected additional packets includes: maintaining the count at a network management device of the communications network; and providing, by the network management device and to the second communication device, the count of the at least one purposely corrupted packet and the selected additional packets.

The indication of the count includes an indication of at least one of i) a number of the at least one purposely corrupted packet transmitted to the second communication device, or ii) a corruption type of the at least one purposely corrupted packet.

The count of packets includes zero selected additional packets.

The count of packets includes a finite number of selected additional packets that are uncorrupted.

The method further includes: determining whether the port coupled to the communications network has a direct connection or an indirect connection to the second communication device.

In another embodiment, a first communication device includes a network interface device having one or more integrated circuits configured to: generate at least one purposely corrupted packet that includes a purposely corrupted packet attribute, transmit the at least one purposely corrupted packet to the second communication device via a port coupled to a communications network, generate a count of packets that are transmitted, the count of packets including the at least one purposely corrupted packet and selected additional packets, and provide to the second communication device an indication of the count of the at least one purposely corrupted packet and the selected additional packets that are transmitted from the first communication to the second communication device via the port.

In other embodiments, the first communication device includes any suitable combination of one or more of the following features.

The one or more integrated circuits are configured to generate a purposely corrupted cyclic redundancy check (CRC) for respective ones of the at least one purposely corrupted packet, and populate a field in a diagnostic packet to indicate a number of packets having the corrupted CRC that are transmitted.

The one or more integrated circuits are configured to generate a purposely corrupted packet having a packet size that is i) larger than a maximum packet size for a communication protocol, or ii) smaller than a minimum packet size for the communication protocol.

The indication of the transmission includes an indication of at least one of i) a number of the at least one purposely corrupted packet transmitted to the second communication device, or ii) a corruption type of the at least one purposely corrupted packet.

In an embodiment, a method for determining a presence or absence of an intermediate communication device between a first communication device and a second communication device includes: determining, by a processor, a first number of packets received at the second communication device from the first communication device; receiving, by the processor, an indication of a second number of packets transmitted by the first communication device to the second communication device, wherein the indication of the second number of packets indicates a transmission of at least one purposely corrupted packet by the first communication device to the second communication device; and determining, by the processor, the presence or absence of the intermediate communication device between the first communication device and the second communication device in response to a comparison of the first number of packets received by the second communication device and the second number of packets transmitted by the first communication device.

In other embodiments, the method includes any suitable combination of one or more of the following features.

The second number of packets is equal to a number of the at least one purposely corrupted packet; and determining the first number of packets received from the second communication device includes: determining whether a received packet from the second communication device is corrupt, and incrementing the first number in response to the determination that the received packet is corrupt.

The method further includes: generating an image that indicates network connections for the second communication device based on the determined presence or absence of the intermediate communication device.

Receiving the indication of the second number of packets transmitted by the second communication device includes: receiving an advertisement of a link layer discovery protocol frame that includes the indication of the second number of packets.

The indication of the second number of packets transmitted by the second communication device includes an indication of at least one of i) a number of the at least one purposely corrupted packet transmitted to the second communication device, or ii) a corruption type of the at least one purposely corrupted packet.

The at least one purposely corrupted packet and the indication of the second number of packets are received at the first communication device; and the method further includes: determining, by the first communication device, whether the port coupled to the communications network has a direct connection or an indirect connection to the second communication device; and transmitting, by the first communication device to at least one other communication device in the communications network, an indication of the determined direct connection or the determined indirect connection.

In another embodiment, a network interface device for determining a presence or absence of an intermediate communication device between a first communication device and a second communication device includes one or more integrated circuits configured to: determine a first number of packets received at the first communication device from the second communication device, receive an indication of a second number of packets transmitted by the second communication device to the first communication device, wherein the indication of the second number of packets indicates a transmission of at least one purposely corrupted packet by the second communication device to the first communication device, and determine the presence or absence of the intermediate communication device between the first communication device and the second communication device in response to a comparison of the first number of packets received from the second communication device and the second number of packets transmitted by the second communication device.

In other embodiments, the first communication device includes any suitable combination of one or more of the following features.

The second number of packets is equal to a number of the at least one purposely corrupted packet; and the one or more integrated circuits are configured to: determine whether a received packet from the second communication device is corrupt, and increment the first number in response to the determination that the received packet is corrupt.

The one or more integrated circuits are configured to generate an image that indicates network connections for the second communication device based on the determined presence or absence of the intermediate communication device.

The one or more integrated circuits are configured to receive an advertisement of a link layer discovery protocol frame that includes the indication of the second number of packets.

The indication of the second number of packets transmitted by the second communication device includes an indication of at least one of i) a number of the at least one purposely corrupted packet transmitted to the second communication device, or ii) a corruption type of the at least one purposely corrupted packet.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any computer readable memory such as on a magnetic disk, an optical disk, or other storage medium, in a RAM or ROM or flash memory, processor, hard disk drive, optical disk drive, tape drive, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for determining a presence or absence of an intermediate communication device between a first communication device and a second communication device, the method comprising:
   determining, by a processor, a first number of packets received at the second communication device from the first communication device;
   receiving, by the processor, an indication of a second number of packets transmitted by the first communication device to the second communication device, wherein the indication of the second number of packets indicates a transmission of at least one purposely corrupted packet by the first communication device to the second communication device, the at least one purposely corrupted packet having been purposely corrupted by the first communication device; and
   determining, by the processor, the presence or absence of the intermediate communication device between the first communication device and the second communication device in response to a comparison of the first number of packets received by the second communication device and the second number of packets transmitted by the first communication device.

2. The method of claim 1, wherein:
the second number of packets is equal to a number of the at least one purposely corrupted packet; and
determining the first number of packets received from the second communication device comprises:
  determining whether a received packet from the second communication device is corrupt, and
  incrementing the first number in response to the determination that the received packet is corrupt.

3. The method of claim 1, wherein the method further comprises generating an image that indicates network connections for the second communication device based on the determined presence or absence of the intermediate communication device.

4. The method of claim 1, wherein receiving the indication of the second number of packets transmitted by the second communication device comprises receiving an advertisement of a link layer discovery protocol frame that includes the indication of the second number of packets.

5. The method of claim 1, wherein the indication of the second number of packets transmitted by the second communication device comprises an indication of at least one of i) a number of the at least one purposely corrupted packet transmitted to the second communication device, or ii) a corruption type of the at least one purposely corrupted packet.

6. The method of claim 1, wherein:
the at least one purposely corrupted packet and the indication of the second number of packets are received at the first communication device; and
the method further comprises:
  determining, by the first communication device, whether the port coupled to the communications network has a direct connection or an indirect connection to the second communication device; and
  transmitting, by the first communication device to at least one other communication device in the communications network, an indication of the determined direct connection or the determined indirect connection.

7. A network interface device for determining a presence or absence of an intermediate communication device between a first communication device and a second communication device, the network interface device comprising:
one or more integrated circuits configured to
  determine a first number of packets received at the first communication device from the second communication device,
  receive an indication of a second number of packets transmitted by the second communication device to the first communication device, wherein the indication of the second number of packets indicates a transmission of at least one purposely corrupted packet by the first communication device to the second communication device, the at least one purposely corrupted packet having been purposely corrupted by the second communication device, and
  determine the presence or absence of the intermediate communication device between the first communication device and the second communication device in response to a comparison of the first number of packets received from the second communication device and the second number of packets transmitted by the second communication device.

8. The network interface device of claim 7, wherein:
the second number of packets is equal to a number of the at least one purposely corrupted packet; and
the one or more integrated circuits are configured to
  determine whether a received packet from the second communication device is corrupt, and
  increment the first number in response to the determination that the received packet is corrupt.

9. The network interface device of claim 7, wherein the one or more integrated circuits are configured to generate an image that indicates network connections for the second communication device based on the determined presence or absence of the intermediate communication device.

10. The network interface device of claim 7, wherein the one or more integrated circuits are configured to receive an advertisement of a link layer discovery protocol frame that includes the indication of the second number of packets.

11. The network interface device of claim 7, wherein the indication of the second number of packets transmitted by the second communication device comprises an indication of at least one of i) a number of the at least one purposely corrupted packet transmitted to the second communication device, or ii) a corruption type of the at least one purposely corrupted packet.

* * * * *